No. 851,762. PATENTED APR. 30, 1907.
H. LEMP.
CONTROLLING MEANS FOR AUTOMOBILES.
APPLICATION FILED JUNE 14, 1905.

2 SHEETS—SHEET 2.

WITNESSES:
George A. Thornton
Arlen Oxford

INVENTOR:
Hermann Lemp,
By Albert G. Davis
Atty.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

CONTROLLING MEANS FOR AUTOMOBILES.

No. 851,762.

Specification of Letters Patent.

Patented April 30, 1907.

Application filed June 14, 1905. Serial No. 265,169.

*To all whom it may concern:*

Be it known that I, HERMANN LEMP, a citizen of the United States, residing at Lynn, county of Essex, State of Massachusetts, have invented certain new and useful Improvements in Controlling Means for Automobiles, of which the following is a specification.

My invention relates to the control of automobiles of the type described in my former application, Serial No. 188,958, filed January 14, 1904, which derives its motive power from electric motors supplied with current from a generator driven by a prime mover carried by the vehicle, and contemplates the method of operation of the vehicle described in my former application, i. e., varying the speed of the engine over wide ranges to vary the speed of the vehicle. For such a method of control it is sometimes desirable that the controlling lever for the engine should be arranged so that it will remain in whatever position it is placed, but if such an arrangement is used, and if the electric circuit connecting the generator to the motors should be suddenly broken, either by accident or design, while the controlling lever for the engine is in a high-speed position, the engine would race.

My invention consists in so arranging the controlling lever for the engine in a vehicle as described above, that while in normal operation it will remain in the position in which it is placed, if the electric circuit is broken it will return automatically to its lowest speed position.

More specifically stated, my invention consists in the combination with said lever of means for returning it to its lowest speed position, and means in the electric circuit for holding it in the position in which it is placed.

Still more specifically stated, my invention consists in the combination with said lever, of a spring tending to return it to its lowest speed position, and a magnetic clutch acting on the lever and having its winding connected in the electric circuit.

My invention will best be understood by reference to the accompanying drawings, in which—

Figure 1:
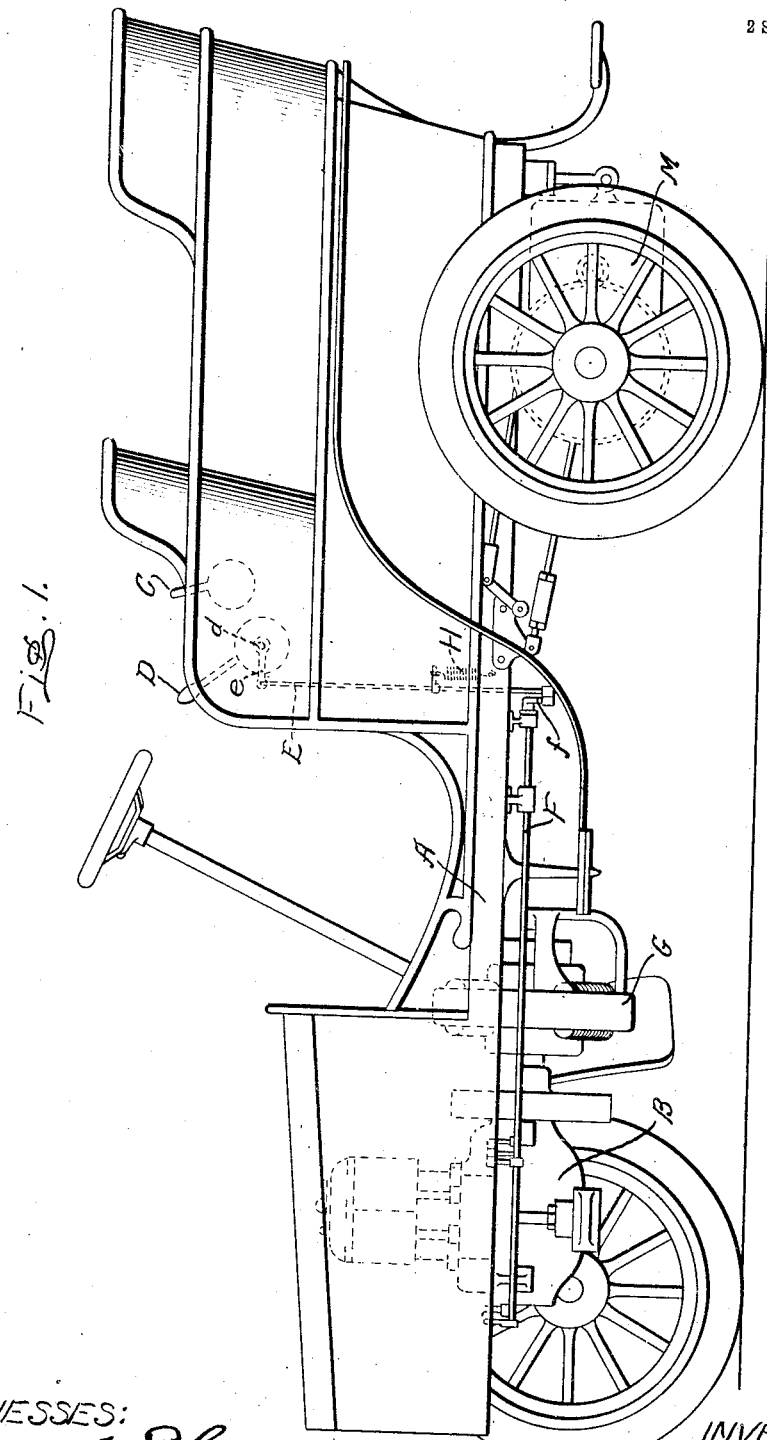
Figure 2:
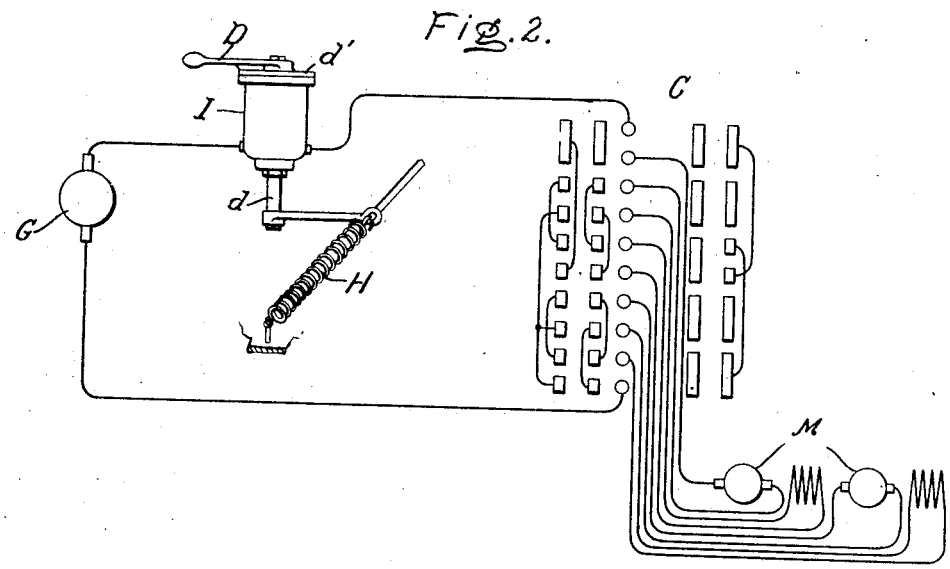
Figure 3:
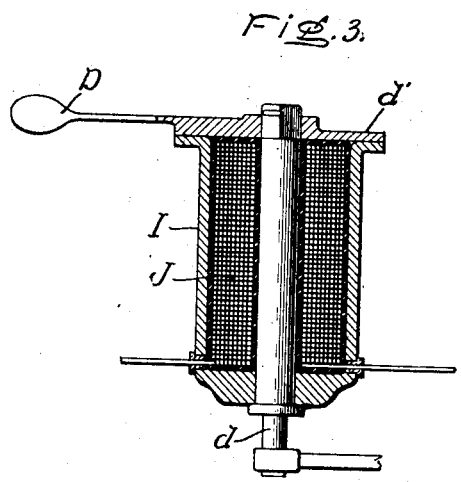

Figure 1 shows a side elevation of an automobile provided with controlling means arranged in accordance with my invention; Fig. 2 shows diagrammatically the electric circuits; and Fig. 3 shows a cross-sectional view of the engine controlling lever and the magnetic clutch.

In Fig. 1, A represents the frame of the vehicle on which is supported the prime mover B, which may be of any well-known type. G represents an electric generator driven by the prime mover B and supplying current to the motors M geared to the driving wheels of the vehicle. C represents a controller in the electric circuit. D represents the engine-controlling lever mounted on the shaft $d$ and connected by means of any suitable mechanism to the engine controlling devices. The connecting mechanism shown comprises a crank $e$, a rod E connected thereto and at the other end connected to a crank $f$ on the shaft F. By the movement of the handle D the shaft F is rocked in its bearings, and this movement may be utilized for controlling the engine in any well-known manner, as by throttling, advancing the spark, etc. H represents a tension-spring which tends to return the handle D of the engine-controlling device to the lowest speed position.

In Fig. 2 the electric circuits are shown. The generator G is shown connected to the motors M through the controlling switch C, which in this figure is shown arranged to connect the motors in series and in parallel for either direction of rotation. It will be understood that the arrangement of the controlling switch C forms no part of the present invention, and may be arranged in any desired manner. The engine-controlling lever D carries a plate $d'$, which serves as the armature of a stationary magnetic clutch I, the energizing coil of which, J, shown in Fig. 3, is connected in the generator circuit. When the lever D is moved to any position, it will be maintained there against the tension of spring H by the magnetic friction clutch I, provided the generator circuit is closed, so that the coil J is energized. If the generator circuit at any time is broken through accident or design, the coil J is deënergized and the lever D is returned to the lowest speed position by the spring H, so that racing of the engine is prevented. The magnetic clutch is designed to have sufficient friction to hold the lever in whatever position it is placed against the spring tension and yet to offer no undue resistance to the movement of the lever by hand.

I do not desire to limit myself to the particular construction and arrangement of parts here shown, but aim in the appended claims to cover all modifications which are within the scope of my invention.

What I claim as new, and desire to secure by Letters Patent of the United States, is,—

1. In a self-propelled vehicle, electric driving motors, a generator supplying current thereto, a prime mover driving said generator, means for controlling the speed of the prime mover, and means for automatically moving said controlling means to its lowest speed position upon an interruption of the generator circuit.

2. In a self-propelled vehicle, electric driving motors, a generator supplying current thereto, a prime mover driving said generator, a lever controlling the speed of said prime mover, and means operative upon a failure of generator current for returning said lever to its lowest speed position.

3. In a self-propelled vehicle, electric driving motors, a generator supplying current thereto, a prime mover driving said generator, a lever controlling the speed of said prime mover, means for returning said lever automatically to its lowest speed position, and means controlled by the generator current for maintaining said lever in other positions.

4. In a self-propelled vehicle, electric driving motors, a generator supplying current thereto, a prime mover driving said generator, a lever controlling the speed of said prime mover, a spring for returning said lever to its lowest speed position, and a magnetic clutch having its winding connected in the generator circuit adapted to maintain said lever in other positions.

5. In a self-propelled vehicle, electric driving motors, a generator supplying current thereto, a prime mover driving said generator, a lever controlling the speed of said prime mover, a spring for returning said lever to its lowest speed position, a magnet winding in circuit with the generator, and an armature for said winding carried by said lever.

6. In a self-propelled vehicle, electric driving motors, a generator supplying current thereto, a prime mover driving said generator, a lever for controlling the speed of the prime mover, a spring for returning said lever to its lowest speed position, and a magnetic clutch having one member stationary and its other member secured to said lever and having its energizing winding connected in the generator circuit.

In witness whereof I have hereunto set my hand this twelfth day of June, 1905.

HERMANN LEMP.

Witnesses:
JOHN A. McMANUS, Jr.,
HENRY O. WESTENDARP.